(12) United States Patent
Truijens

(10) Patent No.: US 7,650,879 B2
(45) Date of Patent: Jan. 26, 2010

(54) TWO-STROKE INTERNAL COMBUSTION ENGINE

(76) Inventor: Franklin Hubertus Truijens, Lage Vuurscheweg 3, NL-1251 TS Laren (NL)

( * ) Notice: Subject to any disclaimer, the term of this patent is extended or adjusted under 35 U.S.C. 154(b) by 12 days.

(21) Appl. No.: 11/661,999

(22) PCT Filed: Sep. 5, 2005

(86) PCT No.: PCT/NL2005/050004

§ 371 (c)(1), (2), (4) Date: Sep. 12, 2007

(87) PCT Pub. No.: WO2006/025743

PCT Pub. Date: Mar. 9, 2006

(65) Prior Publication Data

US 2008/0110445 A1    May 15, 2008

(30) Foreign Application Priority Data

Sep. 3, 2004    (NL) .................................... 1026968

(51) Int. Cl.
  *F02D 41/14* (2006.01)
  *G06F 17/00* (2006.01)
  *F01L 1/34* (2006.01)
(52) U.S. Cl. ...................... 123/676; 123/65 R; 701/103
(58) Field of Classification Search ................. 123/676, 123/27 R, 65 V, 65 R, 65 WV, 65 VD, 316, 123/65 VA; 701/103
See application file for complete search history.

(56) References Cited

U.S. PATENT DOCUMENTS 4,040,400 A    8/1977 Kiener et al.

4,476,821 A    10/1984 Robinson et al.

(Continued)

FOREIGN PATENT DOCUMENTS

EP    0595473 A    5/1994

(Continued)

OTHER PUBLICATIONS

Search Report of the International Searching Authority of the Dutch Priority Patent Application No. 1026968 dated Feb. 8, 2005.

*Primary Examiner*—Stephen K Cronin
*Assistant Examiner*—Johnny H Hoang
(74) *Attorney, Agent, or Firm*—Daniel L. Dawes; Marcus C. Dawes

(57) ABSTRACT

A two-stroke internal combustion engine comprising a combustion space, which is enclosed by a cylinder having an end wall, and a piston that is connected to a crankshaft, which piston is capable of reciprocating motion within the cylinder between a position in which the combustion space has a minimum volume and a position in which the combustion space has a maximum volume, wherein a first valve is capable of closing an inlet opening in the end wall and a second valve is capable of closing an outlet opening in the end wall, which outlet opening is at least substantially closed and the inlet opening is open at the moment when the piston is in the position in which the combustion space has its minimum volume, and wherein the minimum volume of the combustion space in cold condition amounts to less than 3% of the maximum volume of the combustion space.

19 Claims, 3 Drawing Sheets

U.S. PATENT DOCUMENTS

| | | | |
|---|---|---|---|
| 4,995,348 A * | 2/1991 | Melchior | 123/65 VD |
| 5,014,663 A * | 5/1991 | Melchior | 123/257 |
| 5,031,582 A * | 7/1991 | Kruger | 123/90.15 |
| 5,337,707 A * | 8/1994 | Blundell et al. | 123/65 PE |
| 5,778,838 A * | 7/1998 | Taue | 123/73 B |
| 5,857,436 A | 1/1999 | Chen et al. | |
| 6,152,092 A * | 11/2000 | Andreasson et al. | 123/65 R |
| 6,546,901 B2 * | 4/2003 | Green | 123/68 |
| 4,300,486 A1 | 8/2003 | Coney et al. | |
| 6,742,482 B2 * | 6/2004 | Artola | 123/71 R |
| 6,874,453 B2 * | 4/2005 | Coney et al. | 123/65 VD |
| 7,162,996 B2 * | 1/2007 | Yang | 123/321 |
| 2003/0159665 A1 | 8/2003 | Coney et al. | |

FOREIGN PATENT DOCUMENTS

GB 509882 A 7/1939

* cited by examiner

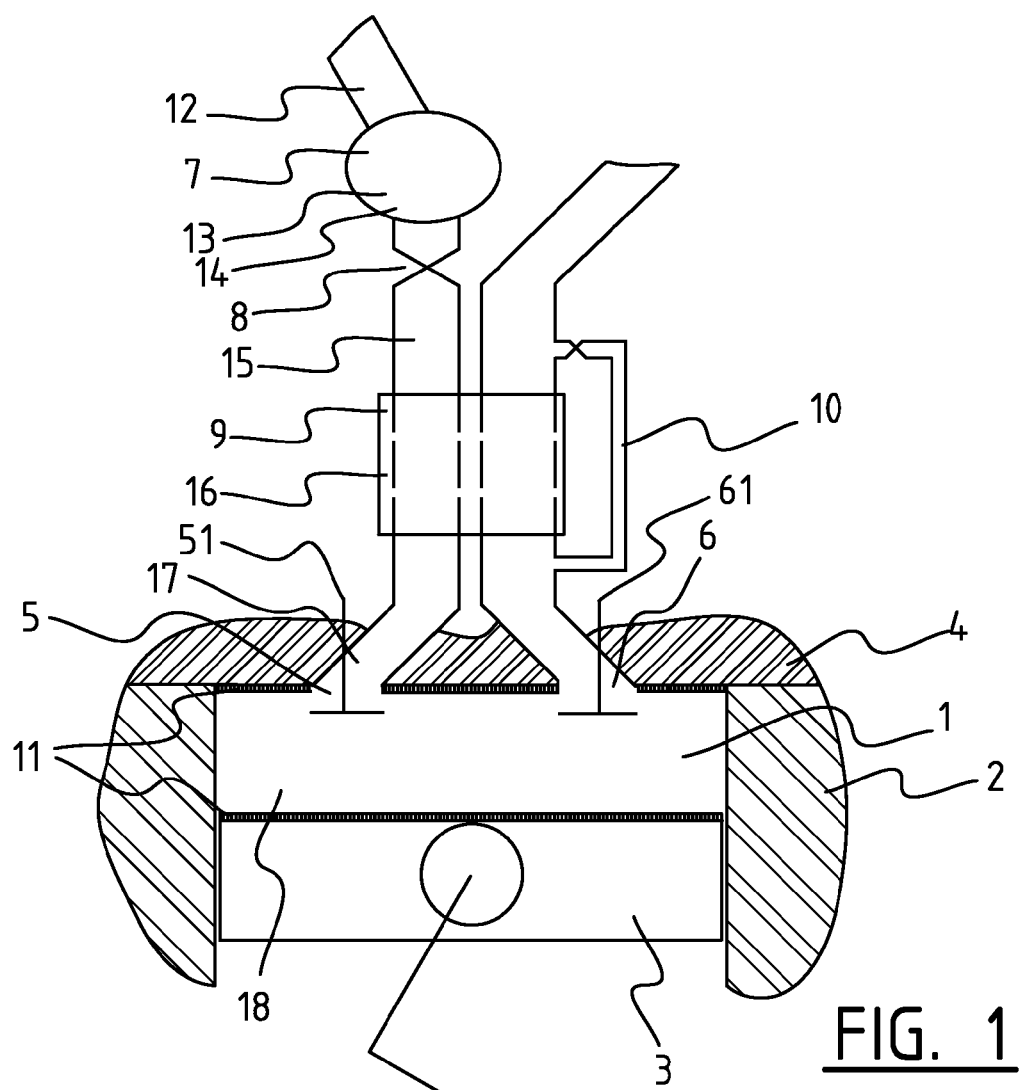
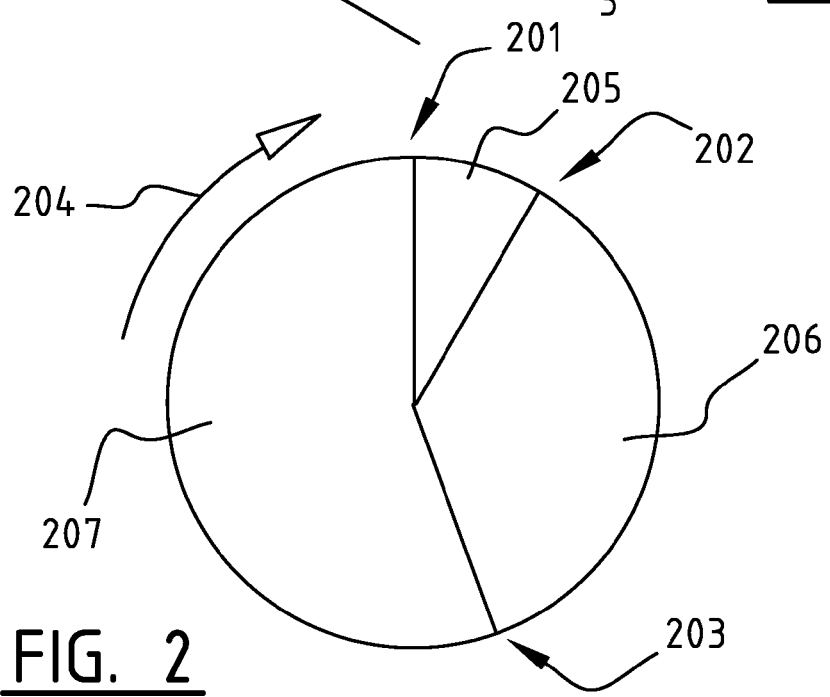
FIG. 1
FIG. 2

TWO-STROKE INTERNAL COMBUSTION ENGINE

The invention relates to a two-stroke internal combustion engine suitable for connection to a gas source under pressure, comprising a combustion space, which is enclosed by a cylinder having an end wall, and a piston that is connected to a crankshaft, which piston is capable of reciprocating motion within the cylinder between a position in which the combustion space has a minimum volume and a position in which the combustion space has a maximum volume, wherein a first valve is capable of closing an inlet opening in the end wall and a second valve is capable of closing an outlet opening in the end wall, which outlet opening is at least substantially closed at the moment when, at least substantially not before said moment, and the inlet opening is open at the moment when the piston is in the position in which the combustion space has its minimum volume.

The inlet opening of the two-stroke combustion engine can be placed into communication with an external gas source under pressure, and fuel can be introduced into the gas flow between the gas source and the combustion chamber, or directly into the combustion chamber, in use by fuel supply means.

Such a combustion engine is disclosed in U.S. Pat. No. 4,476,821.

Engines can achieve a high energetic efficiency when the compression of the air or the mixture takes place at a low temperature and is followed by a heat recuperation with the exhaust flow and/or a thermally insulated combustion. It is a well-known fact that the combustion process in internal combustion engines is adversely affected by relatively cold walls of the combustion space, high local gas temperatures, incomplete mixing of fuel and oxygen and too rapid cooling. Furthermore it is a known fact that the combustion of a mixture is initiated less easily when the fuel-air ratio is low and the mixture has a low initial temperature. Finally it is a known fact that a combustible mixture may combust too rapidly and cause damage to the engine, for example due to backfiring, knocking and/or detonating.

The object of the invention is to alleviate these negative influences and/or achieve an enhanced energetic efficiency. In order to accomplish that object, the invention is in particular aimed at reducing disadvantageous pressure and/or temperature increases.

To that end, the minimum volume of the combustion space (in cold condition) amounts to less than 3% of the maximum volume of the combustion space. In the top dead centre (TDC) position of the piston, the volume of the combustion space is thus maximally 3% of the maximum volume in the bottom dead centre (BDC) position. Preferably, the minimum volume of the combustion space amounts to less than 2%, preferably less than 1.5%, more preferably less than 1%, of the maximum volume of the combustion space. As a result of the low minimum volume of the combustion space, the volume of the combustion space can increase more strongly upon combustion, making it easier to prevent undesirable pressure and temperature increases. The small volume of the combustion space further leads to a reduction of the pressure loss of the gas flowing into the combustion space.

Each of the preferred aspects discussed below can be considered to constitute a separate invention either independently or in combination with each other or with the preceding aspects.

Preferably, the combustion engine further comprises recuperation means for heat transfer from the exhaust gas flow that flows from the outlet opening to the gas flow that flows to the inlet opening.

The energy produced by the combustion energy is preferably controlled by means of the inlet pressure. The introduction of fuel is preferably controlled in such a manner that a reference value is achieved as regards the inlet temperature and/or the exhaust temperature. The introduction of fuel and/or oxygen is preferably controlled in such a manner that a reference value is achieved as regards the emission of a substance in the exhaust flow.

Preferably, the combustion engine to that end comprises control means for controlling the pressure of the gas being carried to the inlet opening. Preferably, the combustion engine further comprises means for measuring the pressure of the gas being carried to the inlet opening and means for controlling the supply of fuel in dependence on the measured pressure. Preferably, the combustion engine further comprises means for measuring the gas temperature in the inlet tract between the recuperation means and the inlet valve, means for comparing the measured gas temperature with a reference value and means for controlling the supply of fuel in such a manner as to approximate said reference value. Preferably, the combustion engine further comprises means for measuring the gas temperature in the exhaust tract between the exhaust valve and the recuperation means, means for comparing the measured gas temperature with a reference value and means for controlling the supply of fuel in such a manner as to approximate said reference value. Preferably, the combustion engine further comprises means for measuring the concentration of at least one substance in the exhaust gas flow, means for comparing the measured concentration value with a reference value and means for controlling the introduction of fuel and/or oxygen in such a manner as to approximate the reference value.

Preferably, the combustion engine further comprises means for controlling the energy delivered to the piston by controlling the opening period of the valve in the inlet opening.

Preferably, the end wall and/or the wall of the piston on the side of the combustion space is (are) at least partially made of a material having a thermal conductivity of less than 45 W/mk, for example high-alloy types of steel and ceramic materials, more preferably less than 30 W/mk, for example certain heat-resistant types of steel, even more preferably less than 5 W/mk, for example ceramic coatings. The loss of heat from the combustion space and the negative influence of the relatively cold wall on the combustion process is reduced in this manner.

The invention will be explained in more detail with reference to an embodiment as shown in the figures, in which:

FIG. 1 is a schematic cross-sectional view of a combustion engine;

FIG. 2 schematically shows an operating cycle of the combustion engine during one revolution of the crankshaft;

Figure 3:
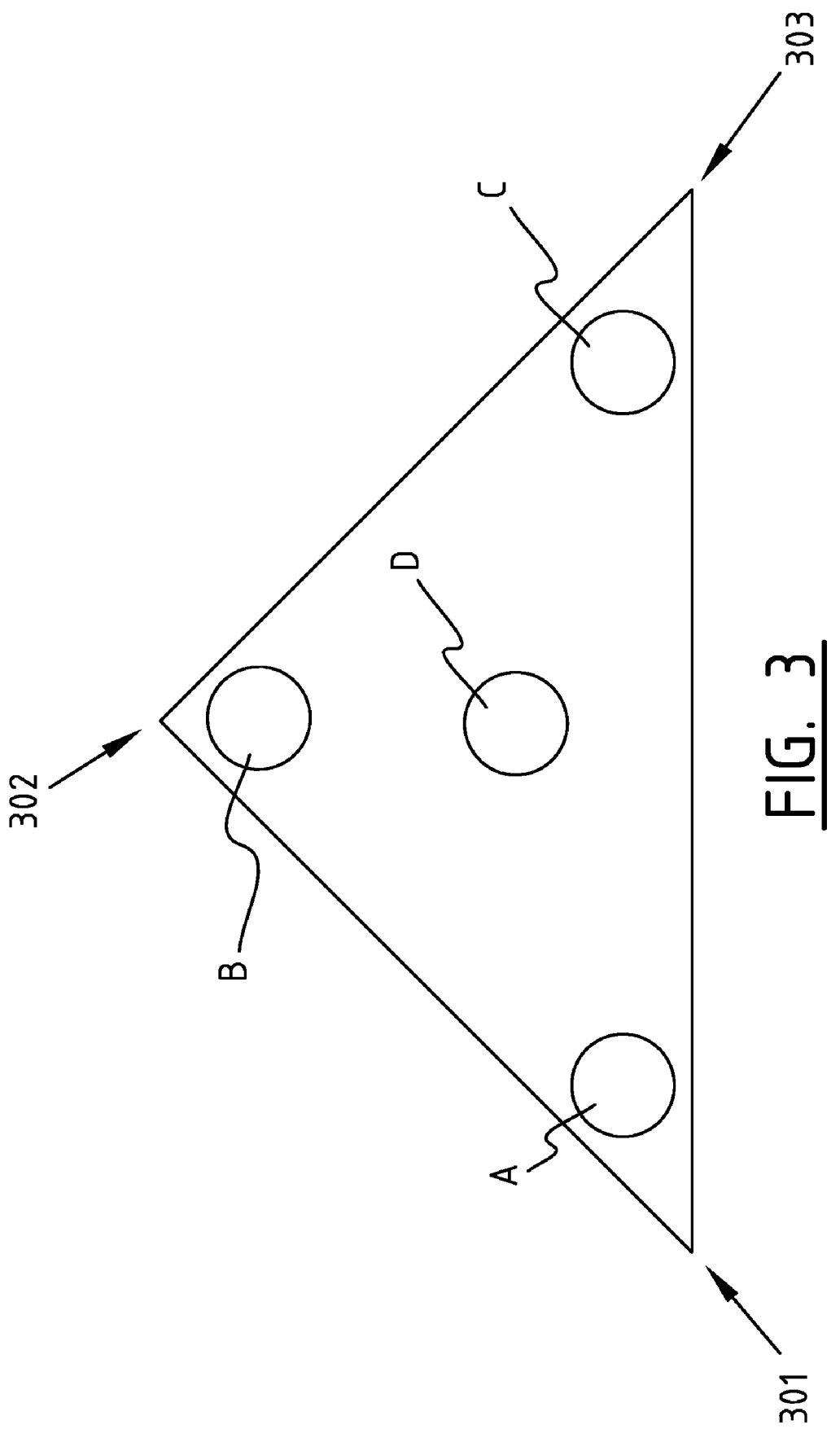
FIG. 3 is a graphic view of operating situations of the combustion engine.

The internal combustion engine as shown in FIG. 1 consists at least of a combustion space 1 formed by a cylinder 2, a reciprocating piston 3 and a cylinder head 4. Said head is provided with at least one inlet opening 5 and one outlet opening 6.

The inlet opening is in communication with a source 7 of a compressed gas (for example ambient air or a residual gas from a process), for example a reservoir or a compression machine, obtained in one or more of steps with intercooling or aftercooling or via internal cooling with, for example, water or oil. The supply of oxygen in the gas can be controlled by using a usual technique, such as admixing by means of water injection (in liquid form or in vapour form) or recirculation of exhaust gas. A control element 8 sets the pressure that obtains in the inlet opening 5 of the engine. The inlet opening is controlled by means not shown and is. substantially open for a short period after the piston has reached its top dead centre (TDC) position, as is shown in FIG. 2; a practical value may be: substantially open at 0° before TDC and substantially closed at 30° after TDC. Other closing time values are possible. The phrases "substantially open" and "substantially closed" are to be understood to mean open to an extent of, respectively, more than and less than 5% of the maximum opening. The outlet opening is controlled by means not shown; a practical value may be: substantially open at 200° before TDC and substantially closed at 0° before TDC, thus preventing any significant recompression of the exhaust gas in the combustion space. The outlet opening is substantially closed when the inlet opening is substantially open. Other opening time values of the exhaust valve are possible. In zero load and partial load situations, in which the pressure in the inlet opening may be low, the opening time of the exhaust element can be delayed to a value of e.g. 90° before TDC.

The inlet opening and the outlet opening can be controlled (by means not shown) in such a manner that it is possible to regulate the opening period and the height of the passage. If the inlet element is configured as an inwardly opening valve, the wall of the piston may be provided with a recess into which the valve disc moves.

The gas may be preheated by recovering heat from the exhaust flow by means of a heat recuperator 9, for example a counterflow-type recuperator, which may be made of a metal and/or ceramics and which is preferably capable of withstanding high temperatures and high inlet pressures. The heat recuperator may be configured with a bypass 10 on the side of the exhaust flow, for example with a view to improving the dynamic control characteristics or reducing the inlet temperature temporarily during peak loads.

To minimise loss of gas pressure when the gas flows into the combustion space, it is desirable that the volume of the combustion space be reduced as much as possible when the inlet opens, the aim being a maximum of about 3% in cold condition. To minimise the loss of heat from the combustion space and the negative influence of the relatively cold wall on the combustion process, at least a wall 11 forming the combustion space is preferably maintained at a high temperature; this can be realised if the wall is made of a (heat resistant) material having a thermal conductivity of less than 45 W/mk. An example may be a ceramic coating, which is microscopically bonded to an underlying metal, or a macroscopically attached protective plate made of a metal; furthermore, one or more walls may be coated with a substance that has a positive catalytic effect on the combustion process. Intermediate forms and combinations are not excluded.

Fuel can be introduced into the gas in solid, liquid or gaseous condition outside the combustion space at each of the positions 12, 13, 14, 15, 16 or 17, and flow through the inlet opening into the combustion space in the form of a high-pressure, high-temperature mixture, which process will be referred to below as indirect fuel introduction. Fuel can also be introduced into the gas at position 18 in the combustion space, which process will be referred to below as direct fuel introduction.

The manner of the introduction of the fuel and any flow resistance elements that may be present, such as bends and inlet means, may affect the mixing process until the mixture reaches the combustion space and during the actual combustion process. The introduction of fuel may take place intermittently and/or be varied as regards space and/or time. For example: it can be attempted to achieve a homogeneous mixture by introducing fuel before the compression phase (current technique used with natural gas); or to achieve a mixing process which is varied as regards time or space by introducing fuel just before the inlet element at the end of the inflow of gas into the combustion space; variations as regards time being: after-injection during the exhaust phase, intermittent injection while using a varying injection pressure; variations as regards space being: using several injection openings, an injector in the cylinder head or the cylinder wall or in the piston, injection (possibly repeated) into a segment of the combustion space with a known macroscopic movement (swirl or tumble) of the combustion gas. Combinations and/or intermediate forms are explicitly not excluded.

As a result of the preheating in the recuperator, an inlet temperature can be achieved at which the mixture (outside or within the combustion space) can undergo a chemical change, such as the breaking up of large molecules into smaller ones and the production of chemically active molecules and intermediate products; this may be accompanied by a slight increase in the temperature of the mixture. Said chemical change may precede and, after a certain starting time (auto ignition delay) pass on to the actual combustion; the latter can be characterized as a substantial increase of the temperature of the mixture, it is accompanied by an irreversible acceleration of the reaction degree of the mixture.

The starting time depends on the inlet temperature, among other things. The inlet temperature may be controlled in order to influence the starting time; in the case of indirect introduction the starting time must be sufficiently long, in the case of direct introduction it must be sufficiently short. A high inlet temperature is desirable in order to achieve a high energetic efficiency level.

The amount of fuel to be introduced (depending on the inlet pressure and the number of revolutions) not only influences the energy that is produced but also the starting temperature of the exhaust flow at the recuperating means and thus also the inlet temperature after the recuperating means. By measuring the inlet and/or outlet temperature and aiming at achieving a reference temperature by controlling the introduction of fuel, it is possible to achieve optimum starting time and energetic efficiency values. The reference temperature may depend on factors such as the inlet pressure, the number of revolutions, the type of fuel, the amount of fuel and the manner in which it is introduced (control profile), the oxygen concentration of the gas, and the construction of the embodiment that is used; the value in question can be determined by experiment.

In addition to the amount of fuel, also the manner of introduction influences the combustion process to a significant degree and thus not only the energy that is produced but also the harmful emissions in the exhaust flow. Due to the higher wall temperature and the presence of the recuperator, the gas temperature at the end of the expansion process may be higher than usual, without this having an adverse effect on the energetic efficiency. As a result of the low minimum volume of the combustion space, the volume can increase more strongly upon combustion, so that undesirable pressure and temperature increases can be prevented more easily. In the case of indirect introduction, the higher energetic efficiency of the operating cycle makes it possible to use a homogeneous mixture that contains less oxygen and/or fuel, whilst a sufficiently low combustion rate is nevertheless achieved with a higher inlet temperature.

Besides typical load situations, such as cold start, zero load, partial load, full load and peak load, typical conditions of use may apply, such as city and harbour traffic, a tropical climate and (local, temporary) emission regimes. The aim may be to achieve an optimum equilibrium between fuel consumption (energy efficiency), the energy produced and the emission of one or more harmful substances, as shown in FIG. 3, in relevant situations A, B, C, D, which can be achieved through a suitable selection of the amount of fuel and the manner of introduction thereof and of the reference values, to be referred to below as the control profile.

A control profile can be determined by experiment during the developing phase of the engine, but it can also be optimized in use by carrying out (possibly continuously) performance measurements; for example: using a knocking sensor, measuring the concentration of solid matter particles, nitrogen oxides, hydrocarbons, oxygen and carbon monoxide in the exhaust flow and the energy produced. From said measurements coherent performance reference values can be derived.

Figure 4:
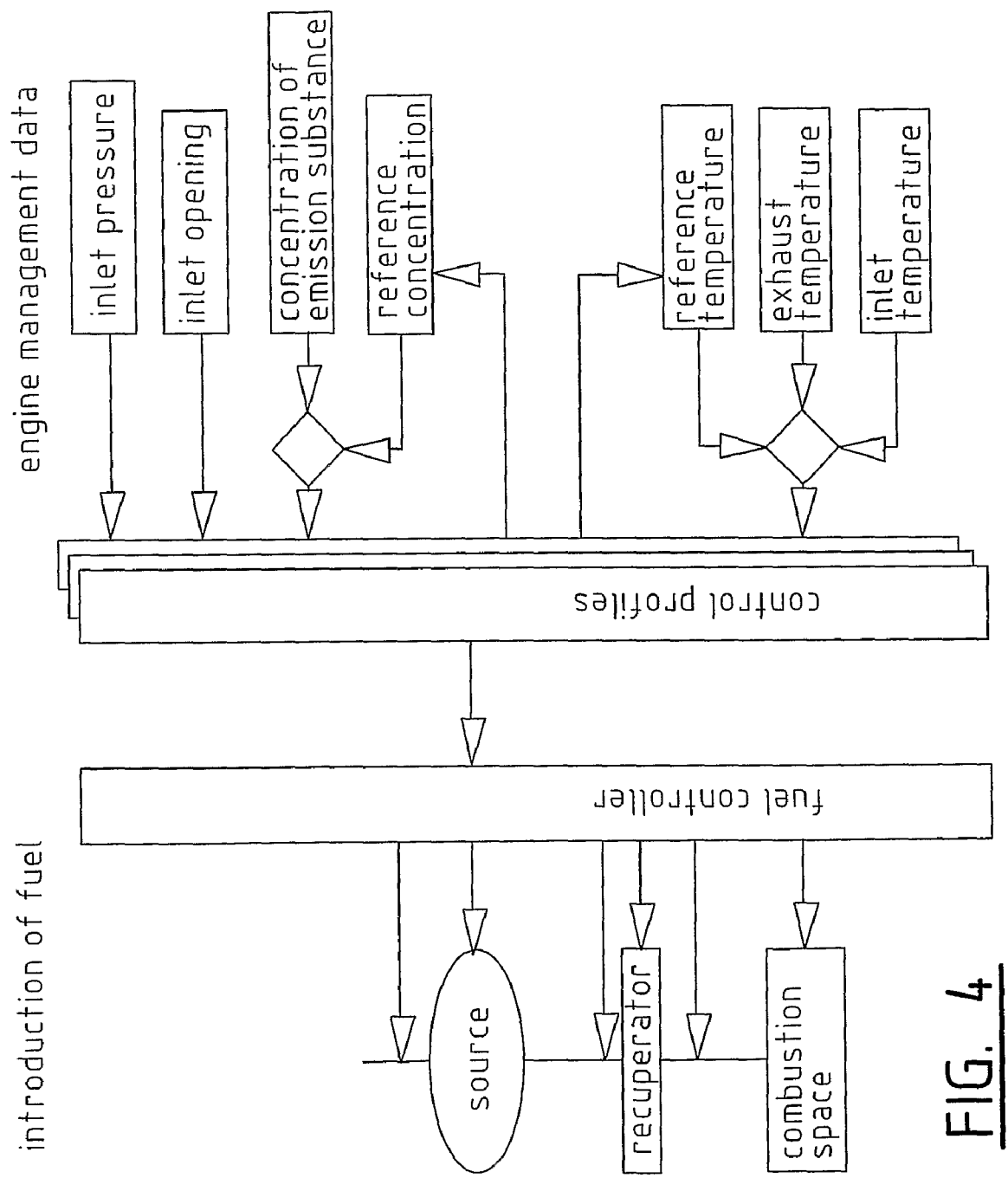
FIG. 4 is a schematic view of a engine management system of the combustion engine.

The combustion process can be optimized by measuring the concentration of at least one substance in the exhaust flow, comparing it with a reference value and controlling the introduction of fuel so as to approximate the reference values. The introduction of oxygen may be controlled in an identical manner and with the same object in view. A control profile can be stored in the form of a characteristic field in an engine management system, it can determine the introduction of fuel in dependence on engine management data, as is shown in FIG. 4. In the cased or multiple-cylinder engines, control can be carried out individually or in groups.

The start of the actual combustion in the combustion space can be influenced by the control profile and/or by a timed positive ignition. Examples are: timed direct introduction at a gas temperature higher than the self-ignition temperature; without the use of further auxiliary means, the combination of a hot wall surface and a local momentary mixture condition obtained by indirect introduction will lead to self-ignition at a desired point in time with a specific number of revolutions; and timed spark ignition.

EXPLANATION OF THE OTHER NUMERALS IN THE FIGURES

201 TDC
202 30° after TDC
203 200° before TDC
204 rotation
205 inlet phase
206 combustion and expansion
207 exhaust phase
301 minimum substance emission
302 maximum energy efficiency
303 maximum energy supply

The invention claimed is:

1. A two-stroke internal combustion engine suitable for connection to a gas source under pressure, comprising a combustion space, which is enclosed by a cylinder having an end wall, and a piston that is connected to a crankshaft, which piston is arranged for reciprocating motion within the cylinder between a position in which the combustion space has a minimum volume and a position in which the combustion space has a maximum volume, wherein an inlet valve is arranged to close an inlet opening in the end wall and an exhaust valve is arranged to close an outlet opening in the end wall, which outlet opening is arranged to be at least substantially closed and the inlet opening is arranged to be open at the moment when the piston is in the position in which the combustion space has its minimum volume, wherein the minimum volume of the combustion space amounts to less than 3% of the maximum volume of the combustion space, further comprising means for transferring/recovering heat from an exhaust gas flow that flows from the outlet opening to an inlet gas flow that flows to the inlet opening, and further comprising means for measuring a gas temperature in an inlet tract between the means for transferring/recovering heat and the inlet valve, means for comparing the measured gas temperature with a predetermined reference value and means for controlling a supply of fuel in a manner to approximate the reference value.

2. An engine according to claim 1, wherein the minimum volume of the combustion space amounts to less than 2%, preferably less than 1.5%, more preferably less than 1%, of the maximum volume of the combustion space.

3. An engine according to claim 1, further comprising control means for controlling the pressure of the gas being carried to the inlet opening.

4. An engine according to claim 1, further comprising means for measuring the pressure of the gas being carried to the inlet opening and means for controlling a supply of fuel in dependence on the measured pressure.

5. An engine according to claim 1, further comprising means for controlling an opening period of the inlet valve in the inlet opening.

6. An engine according to claim 1, wherein the end wall and/or the wall of the piston on the side of the combustion space is at least partially made of a material having a thermal conductivity in cold condition of less than 45 W/mk, preferably less than 30 W/mk, more preferably less than 5 W/mk.

7. A two-stroke internal combustion engine suitable for connection to a gas source under pressure, comprising a combustion space, which is enclosed by a cylinder having an end wall, and a piston that is connected to a crankshaft, which piston is arranged for reciprocating motion within the cylinder between a position in which the combustion space has a minimum volume and a position in which the combustion space has a maximum volume, wherein an inlet valve is arranged to close an inlet opening in the end wall and an exhaust valve is arranged to close an outlet opening in the end wall, which outlet opening is arranged to be at least substantially closed, and the inlet opening is arranged to be open at the moment when the piston is in the position in which the combustion space has its minimum volume, wherein the minimum volume of the combustion space amounts to less than 3% of the maximum volume of the combustion space, further comprising means for transferring/recovering heat from an exhaust gas flow that flows from the outlet opening to an inlet gas flow that flows to the inlet opening, and further comprising means for measuring the gas temperature in an exhaust tract between the exhaust valve and the means for transferring/recovering heat, means for comparing the measured gas temperature with a predetermined reference value and means for controlling the supply of fuel in a manner to approximate said reference value.

8. An engine according to claim 7, wherein the minimum volume of the combustion space amounts to less than 2%, preferably less than 1.5%, more preferably less than 1%, of the maximum volume of the combustion space.

9. An engine according to claim 7, further comprising control means for controlling the pressure of the gas being carried to the inlet opening.

10. An engine according to claim 7, further comprising means for measuring the pressure of the gas being carried to the inlet opening and means for controlling a supply of fuel in dependence on the measured pressure.

11. An engine according to claim 7, further comprising means for controlling an opening period of the inlet valve in the inlet opening.

12. An engine according to claim 7, wherein the end wall and/or the wall of the piston on the side of the combustion space is at least partially made of a material having a thermal conductivity in cold condition of less than 45 W/mk, preferably less than 30 W/mk, more preferably less than 5 W/mk.

13. A two-stroke internal combustion engine suitable for connection to a gas source under pressure, comprising a combustion space, which is enclosed by a cylinder having an end wall, and a piston that is connected to a crankshaft, which piston is arranged for reciprocating motion within the cylinder between a position in which the combustion space has a minimum volume and a position in which the combustion space has a maximum volume, wherein an inlet valve is arranged to close an inlet opening in the end wall and an exhaust valve is arranged to close an outlet opening in the end wall, which outlet opening is arranged to be at least substantially closed and the inlet opening is arranged to be open at the moment when the piston is in the position in which the combustion space has its minimum volume, wherein the minimum volume of the combustion space amounts to less than 3% of the maximum volume of the combustion space, further comprising means for measuring a concentration of at least one substance in the exhaust gas flow, means for comparing the measured concentration value with a predetermined reference value and means for controlling an introduction of fuel and/or oxygen in a manner to approximate the reference value.

14. An engine according to claim 13, wherein the minimum volume of the combustion space amounts to less than 2%, preferably less than 1.5%, more preferably less than 1%, of the maximum volume of the combustion space.

15. An engine according to claim 13, further comprising means for transferring/recovering heat from an exhaust gas flow that flows from the outlet opening to the gas flow that flows to the inlet opening.

16. An engine according to claim 13, further comprising control means for controlling the pressure of the gas being carried to the inlet opening.

17. An engine according to claim 13, further comprising means for measuring the pressure of the gas being carried to the inlet opening and means for controlling a supply of fuel in dependence on the measured pressure.

18. An engine according to claim 13, further comprising means for controlling an opening period of the inlet valve in the inlet opening.

19. An engine according to claim 13, wherein the end wall and/or the wall of the piston on the side of the combustion space is at least partially made of a material having a thermal conductivity in cold condition of less than 45 W/mk, preferably less than 30 W/mk, more preferably less than 5 W/mk.

* * * * *